Aug. 21, 1962 R. P. DIMMER 3,050,591

AUTOMATIC MOBILE TELEPHONE SYSTEM

Filed Dec. 15, 1958

8 Sheets-Sheet 1

INVENTOR.
ROBERT P. DIMMER
BY
C. A. Gulbransen
ATTY.

INVENTOR.
ROBERT P. DIMMER
BY C. R. Sype
ATTY.

Aug. 21, 1962

R. P. DIMMER 3,050,591

AUTOMATIC MOBILE TELEPHONE SYSTEM

Filed Dec. 15, 1958

8 Sheets-Sheet 3

INVENTOR.
ROBERT P. DIMMER
BY C. R. Sipes
ATTY.

AUTOMATIC MOBILE TELEPHONE SYSTEM

Filed Dec. 15, 1958

INVENTOR.
ROBERT P. DIMMER
BY C. R. Sipe
ATTY

INVENTOR.
ROBERT P. DIMMER
BY C. R. Sipe
ATTY.

INVENTOR.
ROBERT P. DIMMER
BY C. R. Sipe
ATTY.

INVENTOR.
ROBERT P. DIMMER
BY C. R. Sipe
ATTY.

INVENTOR.
ROBERT P. DIMMER
BY E. R. Sepie
ATTY.

3,050,591
AUTOMATIC MOBILE TELEPHONE SYSTEM

Robert P. Dimmer, Lombard, Ill., assignor to Automatic Electric Laboratories, Inc., a corporation of Delaware Filed Dec. 15, 1958, Ser. No. 780,321
2 Claims. (Cl. 179—41)

Figure 1A:
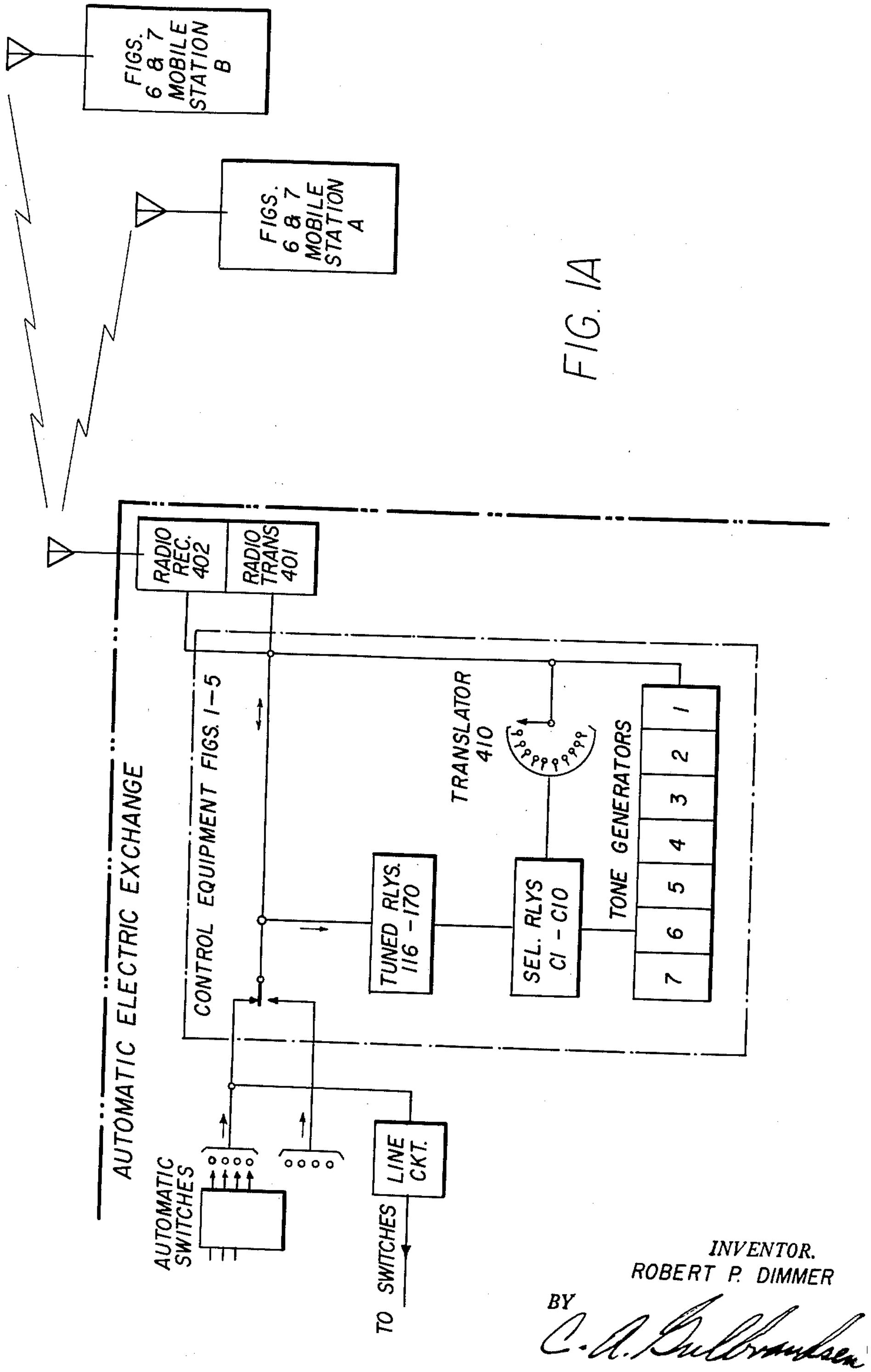

This invention relates in general to automatic telephone systems and more particularly to such systems in which connections may be extended between mobile subscribers and between such subscribers and fixed mobile or regular subscribers.

Essentially this invention provides a system which permits a regular telephone subscriber to dial any mobile subscriber in the system, or any mobile subscriber to dial a regular subscriber or another mobile subscriber. These various functions are accomplished in the present system by means of a novel control equipment in the central office of the telephone exchange.

In the majority of present systems it is necessary for an operator to complete connections between mobile and regular subscribers. It is an object of this invention to provide an automatic mobile system in which the mobile equipment can work satisfactorily into the existing dial telephone equipment without the need of operator supervision.

The novel control equipment is arranged to handle calls in a manner as nearly identical to conventional party line service as is possible, so that it may be added to any existing telephone system where party line service is provided.

This invention may be utilized to provide service between regular telephone subscribers, mobile subscribers, and rural subscribers in relatively inaccessible areas in four ways:

(1) By providing telephone service to isolated ranches, farm houses, and island locations which cannot be served practically or economically by wire lines.

(2) By providing mobile subscriber service for farm, commercial or industrial use in automobiles, trucks, boats, or planes.

(3) By providing radio-telephone communication between the telephone office and its own mobile units for operation and maintenance.

(4) By providing automatic dial service between two mobile subscribers without the intervention of an operator.

In the embodiment shown herein the system of this invention comprises a control equipment connected to a pair of lines similar to a conventional party line of an automatic telephone exchange and has provision for calling twenty mobile subscribers through that equipment. In essence, this arrangement approximates a conventional party line telephone system in all respects except that a push-to-talk button is necessary in the mobile subscribers' equipment.

The arrangement shown herein is in the nature of an improvement over my prior application Serial No. 746,391, filed July 3, 1958, and where possible like parts in this application have been given numbers or characters the same as those used to designate corresponding parts in said prior application.

In general the improvements in this application consist of an improved manner of connecting the control equipment to the telephone exchange so that the dialling of different numbers therein will seize one of two branches to the control equipment and cause the application of any pair of seven generators to be activated and transmitted to select any of 20 mobile stations without having to use a one and two ring code.

In addition in this application, the receipt of the carrier from a calling mobile station, as well as a tone signal generated at that station, must both be received at the control unit before it can be seized and a call initiated. This addition of the tone signal before the equipment can be seized is important in determining that the calling station is within range to the extent that dialling pulses may be received in proper strength, and there will be no instances where carrier alone, which is stronger than the tone signals, would cause seizure by a line which could not complete a call because it is too far away for its subsequently generated tone pulses to be effective.

In the ensuing description, base, land, or fixed station refers to the control equipment at the central office which is connected to the telephone equipment by wire line; mobile station refers to the equipment in the vehicle, plane, or boat which connects to the telephone by radio; fixed mobile station refers to the equipment at one of the relatively inaccessible locations such as a home or farm which is essentially a mobile subscriber and connects to the telephone equipment by radio, but uses a commercial power source for operation of such equipment.

Providing automatic dial telephone service to mobile subscribers presents some unusual problems. In present practice when a telephone subscriber makes a call, a D.C. loop circuit is completed between the subscriber and the central offiffice equipment. This circuit causes a chain of events to take place at the telephone equipment which takes over or seizes an idle selector switch. As long as the subscriber's handset is in an off-hook condition, this circuit is held. When the subscriber dials a number, the circuit is advanced through a network of switches and relays, and eventually to the called line. In a mobile radio system, a similar loop circuit cannot be maintained because the mobile radio transmitter does not remain operated except when the subscriber is talking. Consequently, seizure and holding of a line by the mobile subscriber must be locked in for a period of time (1 to 4 minutes in this case). It is also desirable to permit the mobile subscriber to release this seizure at any time prior to the end of this locked-in period. Also, if the mobile signal used for release is not received, because of atmospherics or distance for example, then the central office control circuits will be automatically released by the timer. Also, if a connection is completed, it is desirable to remove the release timer from the circuit until at least one party hangs up.

In the drawings FIGURES 1, 2, 3, 4, and 5, when considered sequentially, show the base station control circuits.

FIG. 1A is a block diagram showing the relation of the control equipment in the telephone exchange to the various mobile radio stations.

Figures 6, 8:
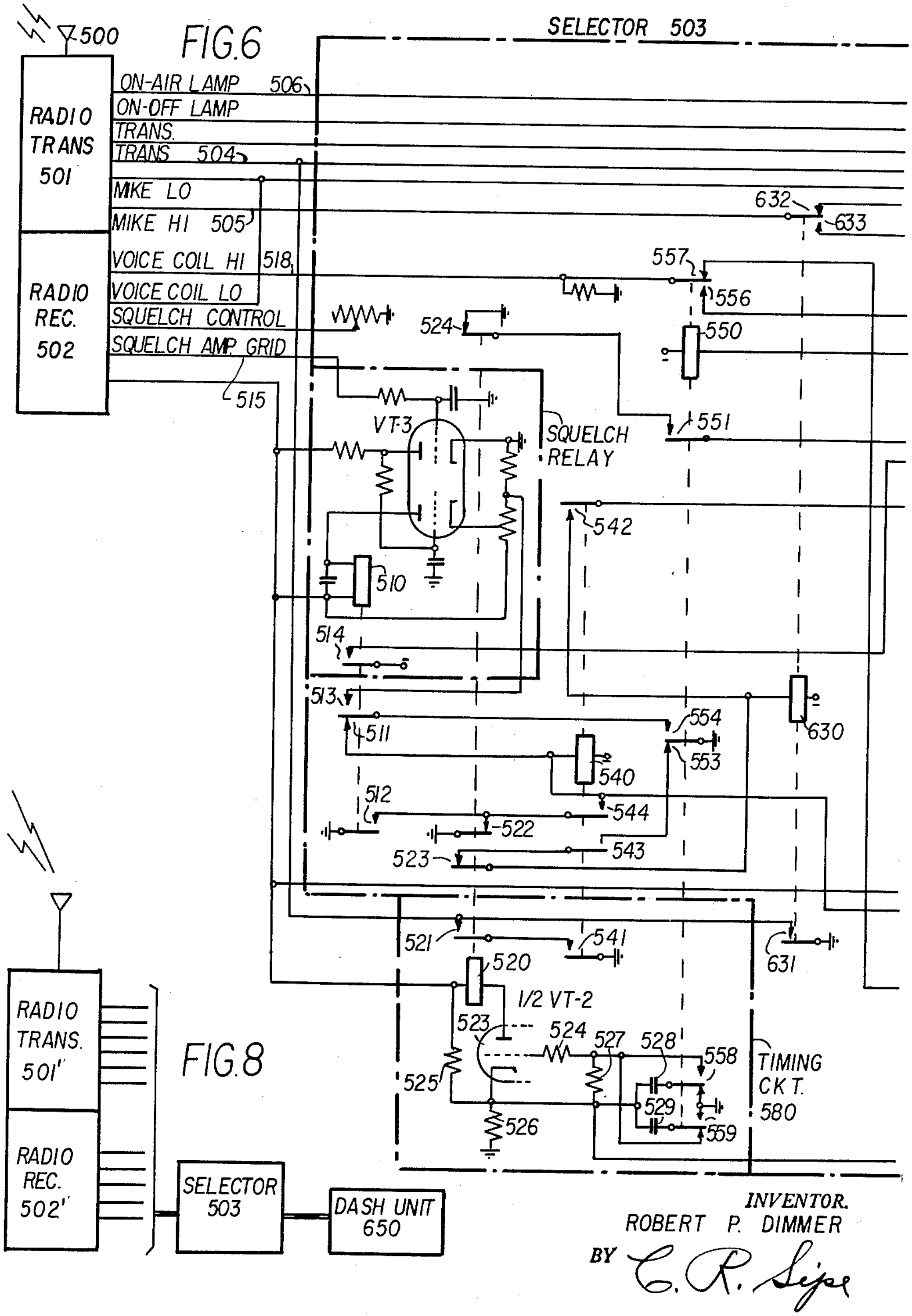
Figure 7:
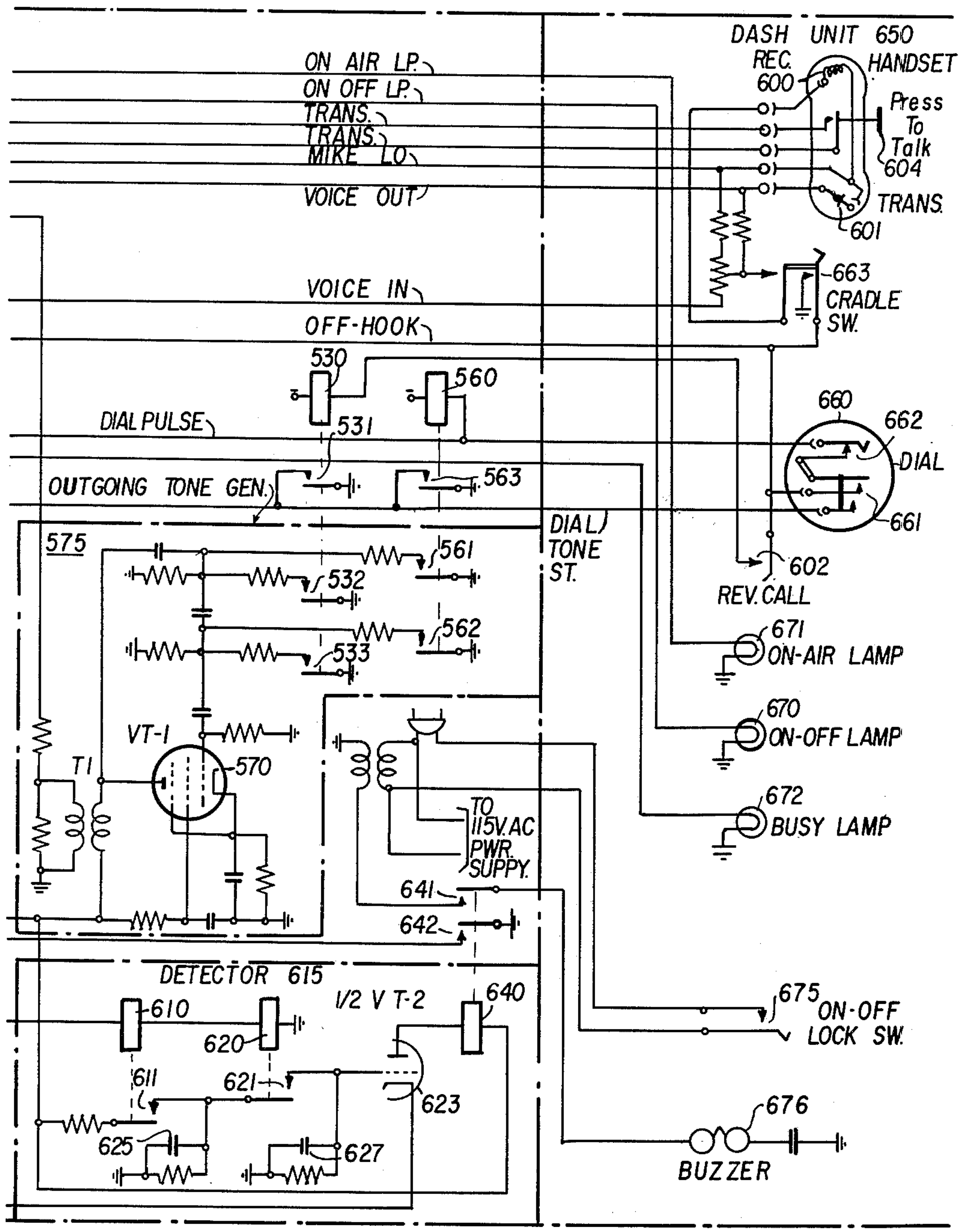

FIGS. 6 and 7 together show the mobile equipment circuits.

FIG. 8 shows a block diagram of the mobile equipment of FIGS. 6 and 7.

Figure 1:
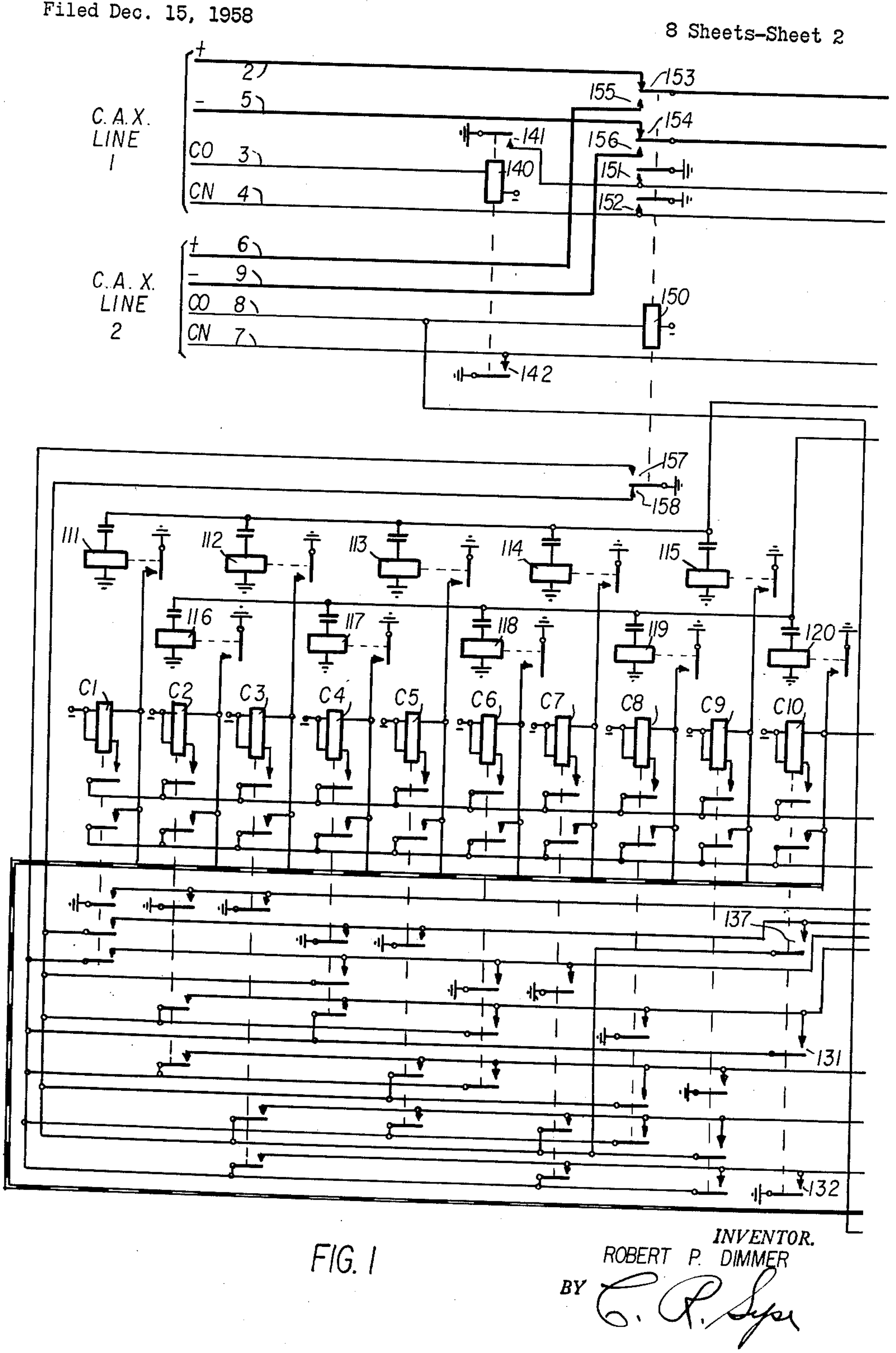
Figure 2:
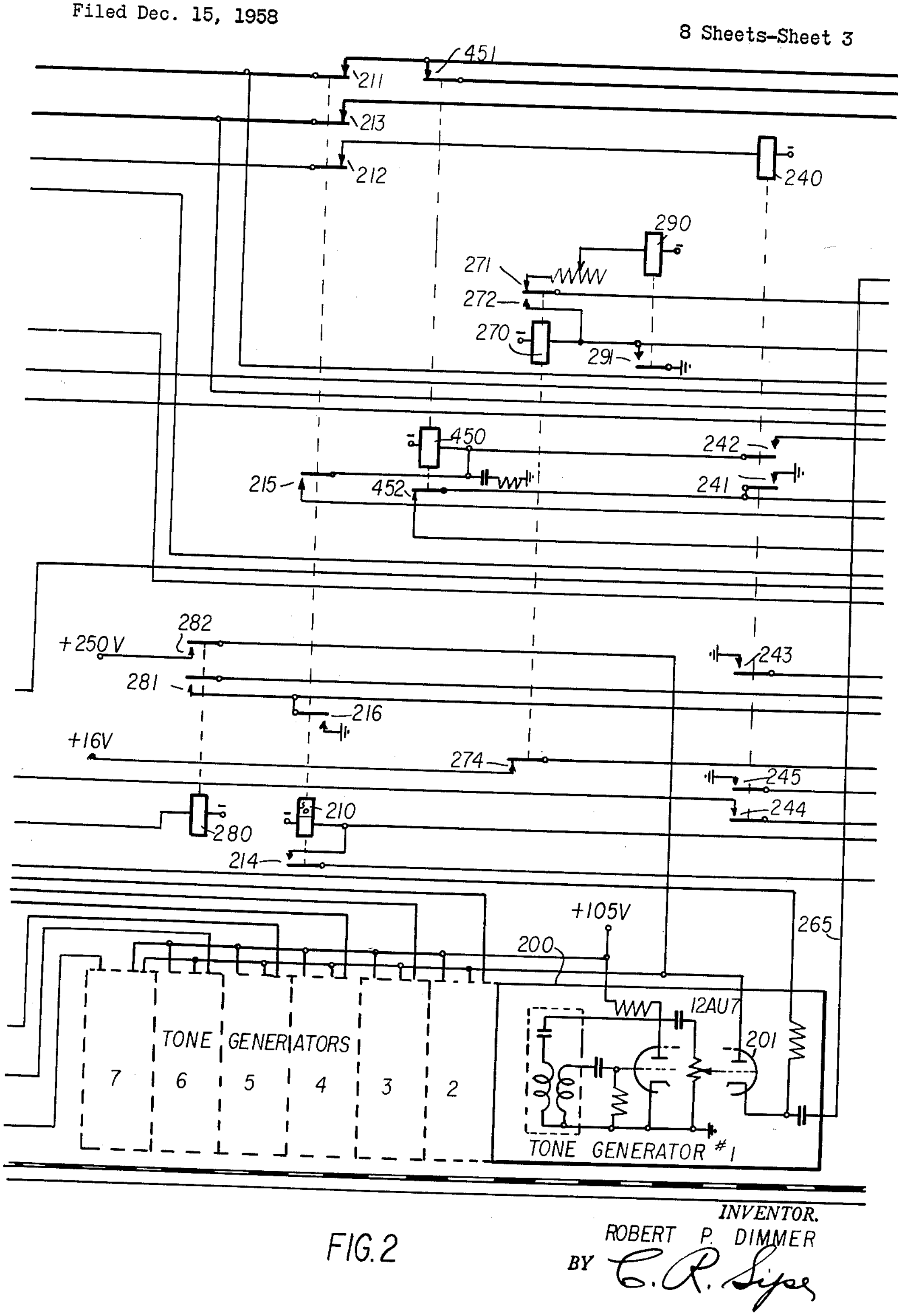
Figure 3:
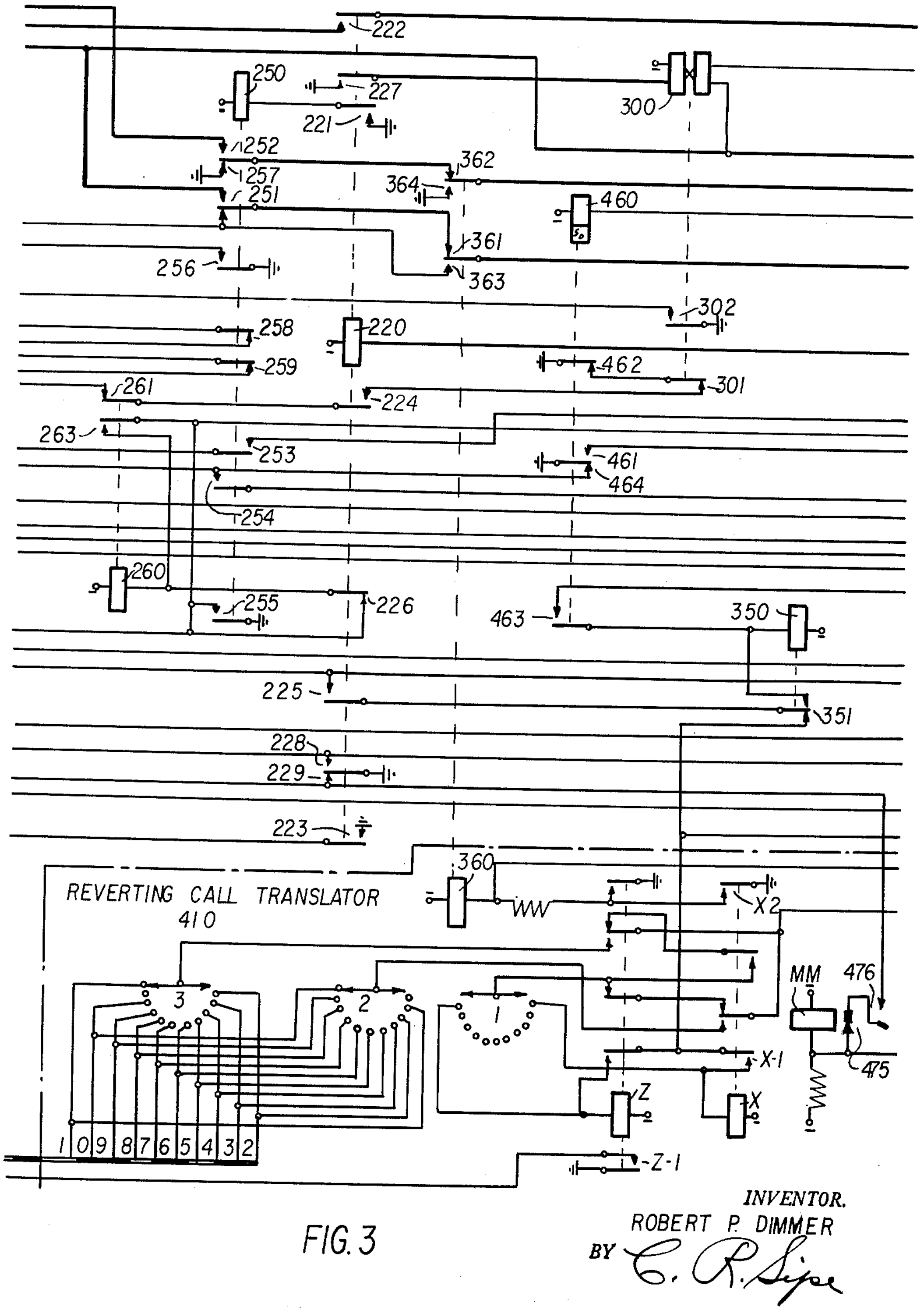
Figure 4:
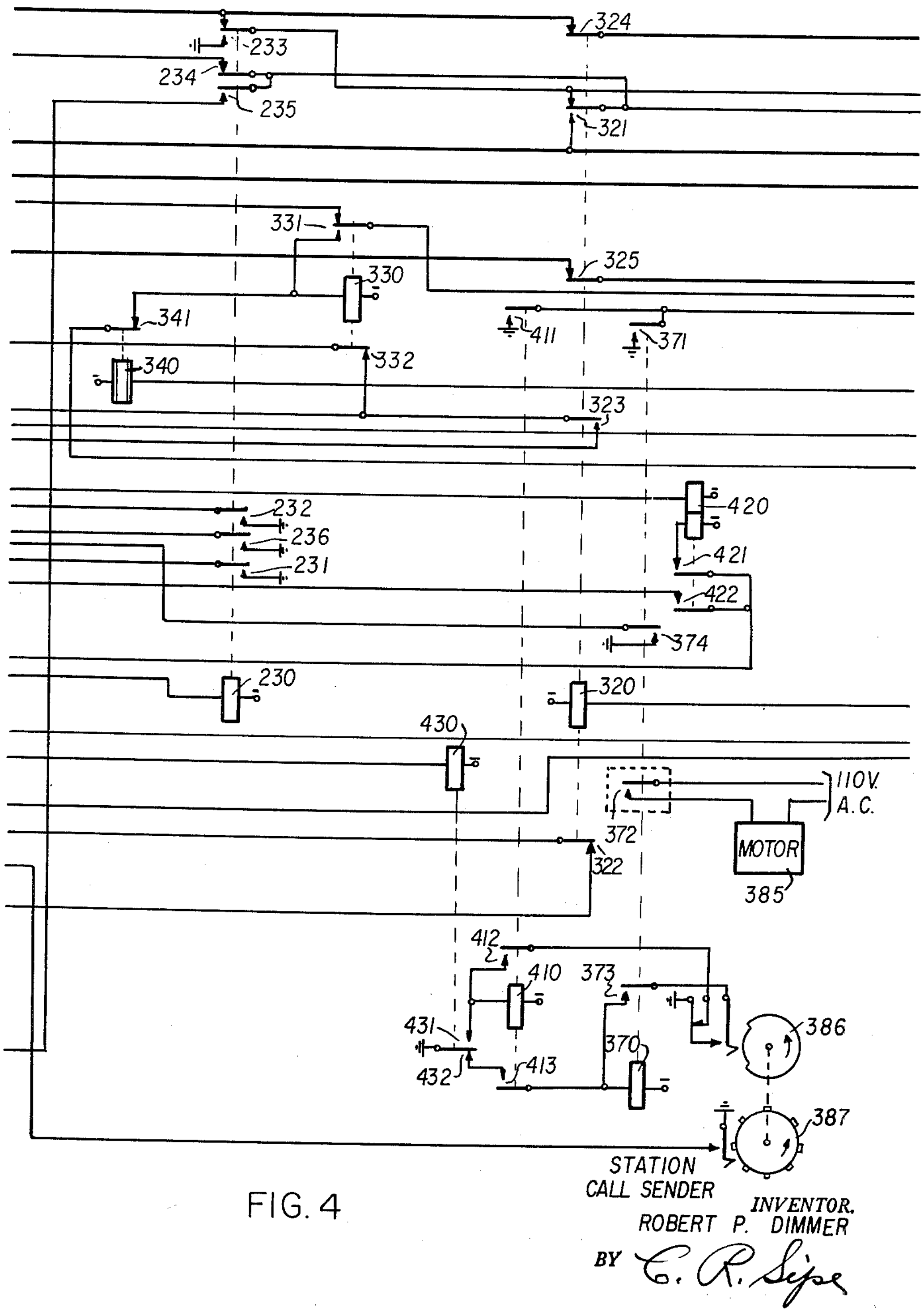
Figure 5:
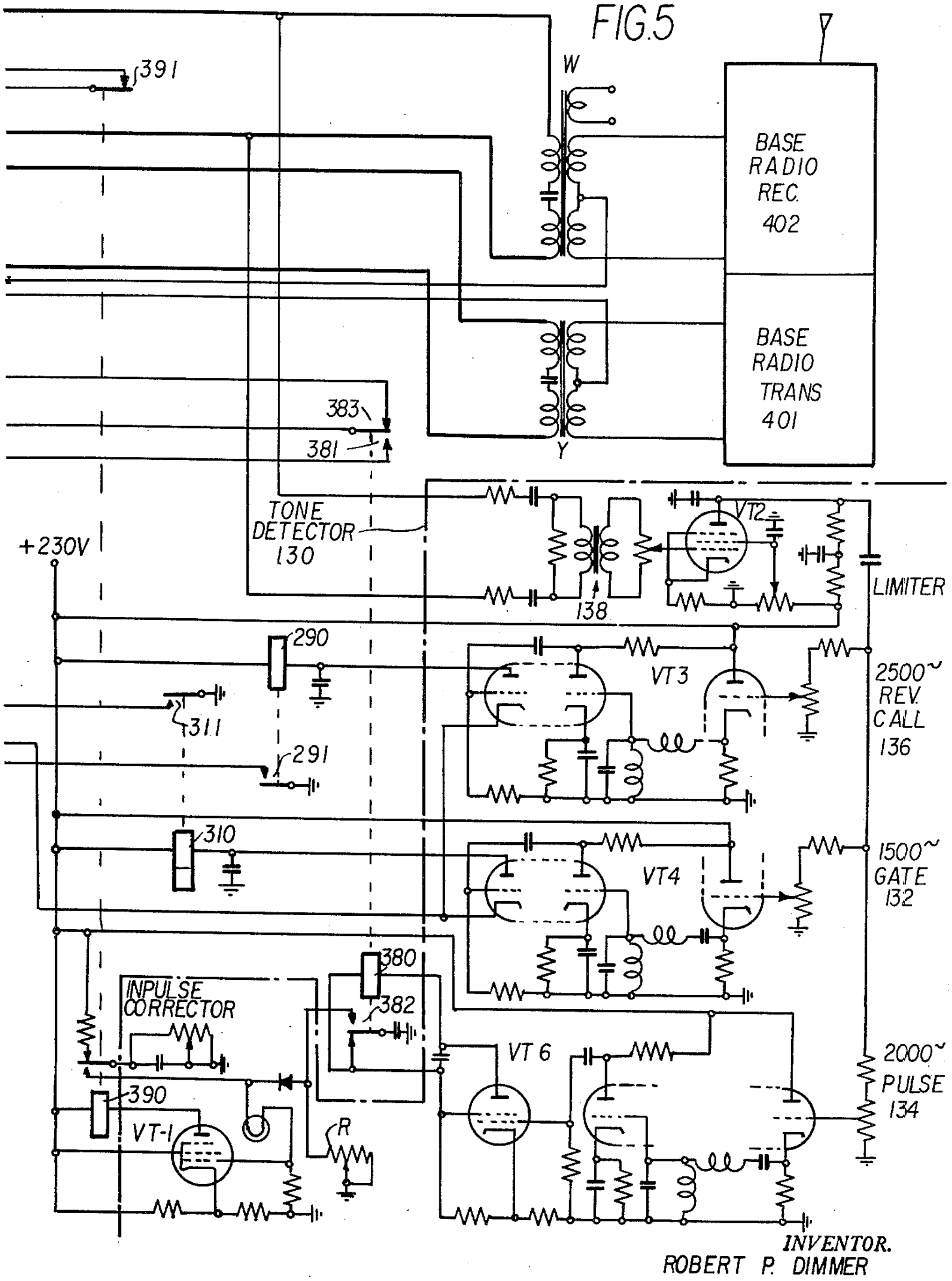

In FIG. 1, the upper half comprises the incoming line equipment and the lower half the tuned relay circuit. These circuits are connected to the control relay circuit of FIG. 2 and a series of tone generator circuits 200 in the lower part of FIG. 2. FIG. 3 contains further control relays and a reverting call translator 410. In FIG. 4 there is shown a further part of the control relays and a station call sender. In FIG. 5 there is shown a radio transmitter 401, receiver 402, and the tone detector 130.

The base station unit includes a power supply (not shown) which furnishes high voltage, 48 volts for relay operation and low voltage for tube filament supply to permit separate operation of the control equipment if desired. The control equipment has versatility and may be operated from a Strowger, all relay, or cross-bar type of telephone office.

Base station transmitter 401, which may be of any well-known type of radio transmitter suitable for the purpose, cooperates with radio receivers, such as 502, of the mobile units over a common carrier channel. Radio transmitters, such as 501, of the mobile units are tuned to a common channel with base station receiver 402, which also may be of any suitable well-known type.

FIGS. 6 and 7, when placed side by side show the arrangement of the equipment at a mobile station. All of this equipment is located in the mobile unit and is suitably mounted therein as shown in the diagram of FIG. 8. The mobile equipment may be subdivided into the dash unit 650; selector 503, which includes a timing circuit 580; detector circuit 615; an oscillator or tone generator circuit 575; and the radio units including transmitter 501 and receiver 502 of well-known type.

It will be noted that both the receiver 502 and the transmitter 501, use the same antenna 500 for receiving and sending the carrier frequencies. The press-to-talk button 604 in the handset 600 is provided for controlling the talk-listen control lead 504, to switch the antenna from the receiver to the transmitter and vice versa.

The dash unit 650 also includes a handset 600, a dial 660, reverting call push button 602, lamps 670—672, master switch 675, and buzzer 676. The selector or mobile control circuit 503 includes, in addition to the timing circuit 580, the incoming detector circuit 615, and the outgoing tone generator circuit 575, the necessary transformers, relays, conductors, resistors, and capacitors. The timing circuit utilizes one half 523 of a vacuum tube and the detector circuit 615 uses the other half 623. The tone generator circuit has a vacuum tube 570 and cooperating components forming an oscillator circuit of a conventional type arranged to generate one frequency normally, another when relay 560 is energized, and still another when relay 530 operates.

There is shown in FIG. 5, the tone detectors 132, 134, and 136 and their operating components, such as resistors and capacitors, for the detection of tone signals from a mobile or fixed-mobile subscriber. In FIG. 1 are shown the ten tone relays C1–C10 inclusive, with their corresponding tuned sensing relays 111–120 inclusive.

Signaling from the base station to a mobile subscriber is accomplished by sending out two tones (between 300 and 500 cycles) to operate a pair of tuned reed relays such as 610 and 620 at the mobile end (FIG. 7). Signaling in the reverse direction is accomplished by transmitting a gate frequency (1500 cycles) and a pulse frequency (2000 cycles) controlled from pulse springs of the dial. It will be understood that these frequencies may be varied or reversed as desired. These pulses are received at the base station receiver 402 and are converted directly into pulses to select the particular called land subscriber. In a reverting call (mobile to mobile) the incoming pulses from one mobile station are translated in the base station equipment into two tones for selecting the other mobile subscriber.

In a conventional telephone system a reverting call is usually made by dialing a particular number, hanging up, and waiting until the ringing stops. In many instances this technique can be confusing and inconvenient. In the present invention there is incorporated a different technique to enable a mobile subscriber to make a rapid reverting call. To make this type of call the mobile subscriber operates a push switch 602 mounted in the dash unit 650, which sets up the control equipment in the base station to accept reverting calls. Then the calling mobile subscriber has only to dial two digits to select the called mobile subscriber.

*Land Subscriber Calls Mobile Subscriber*

The conventional circuits and apparatus in the central exchange are so arranged that when a central exchange subscriber dials a mobile subscriber, he is automatically connected to either the leads 2, 3, 4, and 5 or the leads 6, 7, 8 and 9 of FIG. 1, by the usual automatic telephone switching equipment depending upon the number dialled.

In connecting with these leads, a particular ringing frequency is automatically selected and applied to one of the leads 2 and 5 or to one of the leads 6 and 9. This is done in the same manner that a party line telephone subscriber is selected in the usual party line telephone system. When these leads are thus connected with, ground from the switching equipment is also connected to either the lead 3 to energize relay 140 or to lead 8 to energize relay 150. Either relay will connect ground through springs 141 or 151 and through springs 212 of relay 210 to energize relay 240. Relay 240 energizes and closes a circuit for relay 430 at springs 245, which in turn energizes and closes a circuit for relay 410 at springs 431. Relay 410 places ground on the start lead at springs 411 and over a simplex circuit to transmitter 401 to place it on the air, and prepares a circuit for relay 370 at springs 413. Relay 140 in addition to operating relay 240 also places ground on the CN lead 7 of the CAX line 2 at springs 142 to make the same busy to further calls.

If the call came in over CAX line 2 and energized relay 150, then busy ground will be applied to the CN conductor 4 of CAX line 1 at springs 152. In addition, when line 2 is called, relay 150 switches the CAX lines 6 and 9 to the control line circuit at springs 155 and 156 and disconnects the CAX line 1 at springs 153 and 154. Relay 150 also opens springs 158 and closes springs 157 to switch the ground to a different set of the contacts of relays C1–C10 as a part of the selection of the pair of generators to be selected for transmission over the air to select the desired mobile station. Assuming that CAX line 1 is called, then ringing current incoming over leads 2 or 5 passes through springs 153 and 154, and springs 258 and 259 of relay 250 to cause operation of one of the tuned relays 111 to 120 which in turn causes operation of the associated C relay such as C10, which locks up through springs 244 of relay 240 and 229 of relay 220. When transmitter 401 is thus activated by springs 411 of relay 410 and its carrier placed on the air, all mobile receivers 502 are activated and the squelch relays thereof, such as 510 (FIG. 6) are operated. Relays 510 light the busy lamps 672 at all stations through springs 514 and prepare circuits at springs 512, 513, and 511. When relay 240 operated, it also closed circuits for relays 260 (FIG. 3) and 340 (FIG. 4) at springs 243. Relay 260 energizes to open a point in the circuit of relay 450 at springs 261 and close its own locking circuit at springs 263, and relay 340 opens the circuit of relay 330 at springs 341.

A circuit is closed for relay 280 by the lower make contacts of the operated C10 relay but this relay does not lock up and therefore follows the ringing code under the control of springs 121 of relay 120 to provide intermittent ringing. A particular C relay, such as C10, will select two of the tone generators by closing springs 131, 133 and 137 depending upon whether relay 150 is operated or not, that is dependent upon whether CAX line 1 or 2 was called. If line 1 was called, then generators 2 and 7 are used while if line 2 was called then generators 4 and 7 will be used. The generator 1, shown in detail in FIG. 2, is representative of all of the tone generators 200. Relay 280, at its springs 282, will start and stop these generators and follow the ringing code. The springs 282 of relay 280 connect an anode of the duotriode 201 with the 250v. power supply so that the selected frequencies from the selected tone generators will be applied over the oscillator output lead 265 and springs 251, 361, and 325, to the transformer Y and out over the transmitter 401 to signal the called mobile station.

At the called mobile station, the tuned relays 610 and 620 (FIG. 7), which are tuned to respond to the frequencies of the selected generators 200, will respond and control the associated detector circuit 615 to cause operation of relay 640 which will complete the buzzer circuit at springs 641 and operate buzzer 676, and close the circuit of relay 540 at springs 642. Relay 540 energizes and locks through springs 544 and 512 to prepare certain circuits.

When the called mobile subscriber lifts his receiver to answer the call, the cradle switch springs 663 are closed to complete a circuit for relay 550 which operates to prepare another circuit for relay 540 at springs 554, to open the circuits of relays 610 and 620 at springs 557 to thereby stop the operation of relay 640 and the buzzer, to complete the voice-in circuit from lead 518 through springs 556 to the handset, to start the timing circuit 580 at springs 558 and 559, and to close a point in the circuit of relay 560 at springs 551. Relay 560 is now energized through springs 524 of timer relay 520, when it falls back, to close the tone generator circuit at springs 561 and 562 to cause it to generate a tone of 1500 cycles. Relay 520 of the timer circuit is normally energized when the receiver 502 is activated and when the springs 558 and 559 are operated by relay 550, a charged condenser is connected between the grid and cathode of tube 523 to momentarily bias the tube to cut off and cause relay 520 to release and stay back for a short period of time (2 seconds) until the charge on the condenser is dissipated through resistor 527. Relay 520 closes springs 521 to connect ground to the talk-listen control lead 504 so that the transmitter will place carrier on the air, closes springs 522 to complete a second locking circuit for relay 540, not needed at this time, closes springs 523 which close a point in the circuit of relay 630 which is open at this time, and closes springs 524 in the circuit of relay 560.

When the mobile subscriber answers in this manner, the receiver 402 at the base station is activated by receipt of the carrier from transmitter 501 and relay 460 (FIG. 3) operates when the activated receiver places ground on the lead 471, and through springs 331 to the relay. Relay 460 closes springs 461 to complete a circuit through springs 323 and 332 for relay 220 which in turn operates to close the circuit of relay 250 at springs 221. Relay 250 closes springs 256 to close a circuit for relay 290 which operates after a time delay of about 30 seconds. Relay 220 is held energized through springs 241 of relay 240 and 253 of relay 250 to hold these relays operated. Relay 250 removes the tone generators 200 from the base radio transmitter 401 at springs 251. Relay 220 also opens the locking circuit of the C10 relay at springs 229, and closes the incoming line at springs 222 through the winding of relay 300 to cause the usual ring-cut-off relay in the telephone equipment to operate. After an interval of 30 seconds, relay 290 operates to close the circuit of relay 270 at springs 291 which opens the circuit of relay 290, at springs 271, locks itself at springs 272, and opens the 16 v. circuit to the gate and reverting call tone detectors at springs 274. The talking circuit is now completed through transformers Y and W to the radio transmitter and receiver, and conversation may now proceed.

*Release*

If the mobile subscriber should hang up first, his carrier plus a tone of 2000 cycles over lead 655 would be placed on the air automatically for 2 seconds. Relay 550 deenergizes, when the cradle switch 663 opens, relay 550 closing one point in a circuit for relay 630 at springs 553, and starting the timer circuit at springs 558 and 559. The timer circuit 580 functions as before except that a different charged condenser is connected to tube 523 and relay 520 falls back to, in this case, complete the circuit of relay 630 at springs 523 from ground at springs 553. Relay 630, at springs 633, applies the 2000 cycle tone to the voice-out lead 505. After the time interval, relay 520 operates and opens the circuit of relay 630 at springs 523, opens the locking circuits for relay 540 at 522, and opens springs 521. This spurt of tone of about 2 seconds duration will pass through the tone detector transformer 138 to the tone detector 134 (FIG. 5) and will closing springs 411. After the dial tone is received at the operate relay 380 in the base station. This release signal can only occur when the mobile station initiated the call or was called as relay 540 would not otherwise be operated. Relay 330 (FIG. 4) will be operated through springs 381 and 341 after relay 340 falls back. At springs 332, relay 330 causes relay 220 (FIG. 3) to release and thus opens the line to the telephone equipment so that the exchange equipment will be released. If the land subscriber fails to hang up, he will then be placed on lockout after an interval of time, depending upon the equipment in the exchange in the usual manner.

When relay 220 releases it opens the circuit of relay 430 which in turn closes the circuit to relay 370 and starts the code motor 385 to transmit a code indicating the identity of the control equipment at the sending station as will be later described.

It will be noted that while relay 240 was energized, it maintained the circuit of relay 450 open by holding relay 360 energized so that the release timer 440 is not functioning.

If the land subscriber should hang up first, then relay 140 would release when ground is removed from the lead 3. This would release relay 240 to cause all relays in the control equipment to release and return all circuits to normal.

A mobile subscriber, other than the called mobile subscriber, is not prevented from breaking in on an existing conversation if an emergency arises. However, if he does break in on an existing call, he cannot release that connection when he hangs up.

*Mobile Calling Land Subscriber*

In a mobile initiated call, removal of the mobile handset 600 of the dash unit from its cradle causes the radio transmitter 501 to go on the air for two seconds automatically. This is accomplished by the operation of relay 550 by closure of the cradle switch, which also closes a point at 551 in the circuit of relay 560 (FIG. 7). Relay 550 closes a circuit for relay 540 at springs 554, closes the voice-in conductor at 556, and closes the timer circuit at 558 and 559. The timer relay 520 operates by falling back for the two second interval to close the talk-listen circuit at springs 521 and through 541 and close the locking circuit of relay 540 at springs 522. Relay 560 is now energized through springs 524 and 551 and starts the tone generator at springs 561 and 562 to start the oscillator to generate 1500 cycle tone and apply it to lead 655, and closes the circuit of relay 630 at springs 563. The closure of springs 521 causes the carrier to be placed on the air for the time interval measured by the relay 520. Reception of this carrier by the base radio receiver 402 causes relay 460 (FIG. 3) to operate as previously described. Relay 460, at springs 461, closes a point in the circuit of relay 220.

Receipt of the 1500 v. tone causes gate circuit 132 of FIG. 5 to function to operate relay 310 and close springs 311. Springs 311 close the circuit of relay 320 (FIG. 4) which closes a point in the line circuit to the telephone exchange at springs 321, completes the circuit of relay 220 at springs 323, and opens other circuits not important at this time. Relay 220 is now caused to operate to complete the line circuit of the line to the telephone exchange at springs 222 and to close the circuit of relay 250 at springs 221. Relay 250 closes the circuit of relay 290 at springs 256 which relay energizes after an interval to close the circuit of relay 270, which opens the 16 v. supply to the gate circuit 132, and the reverting call detector circuit 136. When the line is seized by closure of springs 222, ground is returned over the C.O. lead 3 in the usual manner from the exchange to operate relay 240, and dial tone from the telephone exchange is returned by the base radio transmitter 401 to the mobile unit. Springs 228 of relay 220 and springs 245 of relay 240 both close the circuit of relay 430 to in turn operate relay 410 to place transmitter 401 on the air by mobile radio receiver 502, the mobile subscriber may begin to dial. When the dial 660 is moved off-normal, the off-normal contacts 661 close to energize relay 560 from ground at 663 through springs 662 and 661, to in turn complete another circuit for relay 630 via springs 563 and 542 in the mobile unit to in turn close springs 633 to connect up the output tone lead from the oscillator circuit to the transmitter. The 1500 cycle tone generated by closure of springs 561 and 562 is received by the base station radio receiver 402 and the tone detector 132 which causes gate relay 310 to be operated. Relay 380 is operated each time the relay 560 falls back in response to the operation of dial springs 662. The intermittent operation of relay 560 causes 1500 and 2000 cycle currents to be alternately transmitted to the base station. Thus the gate relay 310, being slow acting, is held energized, and relay 380 together with its slave relay 390 follows the pulses by means of 2000 cycles and detector 134. Relay 320 is held energized through springs 311 of relay 310 and, at its springs 321, shorts out the winding of relay 300 in the line circuit to improve dialing. Relay 340 is also slow acting and remains operated during the pulses and the opening of springs 383, to hold open the circuit of relay 330. Relays 310, 380, and 320 fall back at the end of each digit, when relay 630 falls back as springs 661 open. In this type of dialing it is necessary that both the gate and pulse signals be received before any actual dialing can occur at the telephone exchange. This makes the dialing operation less affected by noise, etc. Operation of relay 250 removes the sensing relays 111–120 from the circuit at springs 258 and 259 to prevent their affecting the characteristics of the dial pulses.

By the transmission of the proper number of digits of the called number, sent by the operation of springs 382 of pulsing relay 380, through impulse correcting circuit and relay 390 and consequent operation of springs 391 the connection will be extended through the usual automatic telephone switching equipment, and, upon response of the called party, battery will be reversed in the usual manner back to the control equipment to operate relay 300 in the control circuit. Relay 300 operates relay 270 at springs 302 which in turn removes the reverting call and gate tone detectors 136 and 132 from the circuit at springs 274, and opens the timing circuit as described. The pulse detector 134 is left in the circuit for release purposes.

It has been found that pulses incoming from a mobile station will often vary as to percent make and break. In order to compensate for this variation I have provided a novel impulse corrector shown at the lower left of FIG. 5. The relay 380 which responds to and follows incoming pulses, transfers a capacitor charge through springs 382 to the grid of tube VT–1 to cause it to conduct. The variable resistor R across this capacitor, when 382 are closed, may be adjusted so that only a spurt of voltage is received by the grid. When the tube VT–1 conducts it causes operation of relay 390 which operates its impulsing springs 391 and also places a variable voltage charge on the grid circuit. An adjustment of the resistor in this last circuit may be made to obtain the recommended 61.5% break and 38.5% make of the impulsing contacts.

The relay 450 controls the timed release and will only operate after its circuit has been closed for 1.4 minutes. With this arrangement relay 460, which is slow acting, may fall back if carrier is not received by receiver 402 at frequent intervals, and close a circuit for relay 450 through springs 462, 301, 224, 261, and 242, if carrier is not so received. When relay 450 energizes it operates its springs 451 to release the connection. These springs open the holding circuit back to the exchange, and springs 452 open a point in the circuit of relay 220. Relays 240 and 260 hold the circuit of relay 450 open during a connection so that timing is not effective.

*Release*

When the mobile subscriber hangs up, the mobile carrier is automatically placed on the air with the tone of 2000 cycles for two seconds. This is caused by the deenergization of relay 550 which again causes the timer 580 to function and relay 520 falls back for a two second interval to hold relay 540 operated, to complete the circuit of relay 630 for that interval through springs 553, 523, and 543 and close the talk-listen circuit. Relay 630 applies the 2000 cycle tone. This long tone holds pulse relay 380 operated through detector 134 so that relay 340 falls back to complete a circuit for relay 330 through springs 341 and 381 of relay 380. Relay 330 opens the holding circuit to relay 220 and the circuit of relay 460 which releases all relays in the control equipment. The system is now ready to receive other calls.

In any mobile initiated call the timing release circuit, including timer relay 450, starts timing the call as soon as carrier is removed (2.5 minutes in this case). If the base station answers, this timing circuit is ineffective, as the circuit of relay 450 is opened by relay 300. If the base station does not answer and the mobile release signal is not received, that is, if the mobile unit should travel out of range before hanging up, then the timing circuit releases the locked in seizure after the predetermined time. This is necessary because the mobile unit does not transmit continuously, and therefore must lock up on seizure on a time release condition. This prevents locking up the system indefinitely.

*Mobile Calling Another Mobile Subscriber*

When a mobile subscriber wishes to make a reverting call, he must press the reverting call button 602 for a moment. This energizes relay 530 to close springs 532 and 533 to cause the oscillator to generate 2500 cycles and the timer relay 520 operates as before to place the mobile transmitter on the air with the 2500 cycle tone. Relays 550, 560, and 540 energize as before and springs 531 close the circuit of relay 630 through springs 542 to apply the tone to the voice-out lead. At the base station the reverting call detector 136 responds to 2500 cycle tone and causes reverting call relay 290 to operate. This operates slow relay 210 through springs 291 to disconnect the CAX lines 1 and 2 from the control terminal at 211, 212, and 213 so that no seizure of switching equipment in the exchange occurs. Relay 230 also operates over springs 216 and places ground on leads 4 and 7 over 231 and 236 of the lines to make them busy to any land subscriber. Relays 210 and 230 are locked up through springs 223 of relay 220 which operated as previously described when relays 460 and 320 operated as carrier and gate tone were received. Relay 230 also shifts the pulsing springs of relay 390 over to the reverting call translator 410, at springs 233 and 235, and to the operating magnet MM of this rotary switch. The calling mobile subscriber now dials two digits, either 01 to 00 or 11 to 10, and operates pulsing relay 560 in combination with relay 630 as previously described to send alternate pulses of 1500 and 2000 cycles to operate relays 380 and 390 in the control equipment.

If he dials 10, for example, the relay X (FIG. 3) operates on the first digit, and a C relay (FIG. 1) operates over one of the leads 1—0 on the second digit, through contacts of either X or Z relay and springs 322 of relay 320, springs 351 of relay 350 and springs 225 of relay 220, to ground at springs 216 of reverting call relay 210. The first digit selects the correct wiper 2 or 3 by operating either relay X or Z, and the second digit selects the correct pair of tone generators 1–7 for signaling the called station, and applies them over lead 265 and through springs 363 and 364 to the transmitter 401. When 10 is dialed, the first digit steps wipers 1, 2, and 3 to their first contacts, and when relay 320 deenergizes at the end of that digit, the ground at springs 351 is connected through springs 322 and over wiper 1 to energize the X relays and lock it up to ground direct on springs 351 through springs X–1. Springs X–2 close a circuit for relay 360 so that relay will be operated. The next digit 0 will step the wipers 1, 2, and 3 to the tenth contact 0 leading to the C10 relay of FIG. 1. As relay X is locked up and relay Z is not operated, only the number 2 wiper is activated, and after relay 320 falls back at the end of this digit, the same ground through springs 351 and 322 is connected through wiper 2 to the C10 relay to operate it and select again the generators 2 and 7. If digit 01 is dialled or any number 01 to 00 then relay Z will be operated on the first digit and at springs Z–1 will close the circuit of relay 150 to complete the selection as described. The relay 280 is also operated with the C10 relay, and the selected generators are connected to the output lead 265. The operation of relay 360 now connects the selected tones on lead 265 to the transmitter through springs 363 and 364, and signals the called mobile party. During the transmission of the first digit from the calling mobile to the control equipment, the relay 460 operates, and, upon its first release, closes a circuit for relay 420 at springs 464 and through springs 254, which operates but does not lock up at this time. Relay 460 again operates for the second digit and as the proper C10 relay is operated upon the end of such digit, and also the relay 280, the relay 420 which is again operated after this second digit will now lock up through its own springs 421, springs 281 of relay 280, and springs 216 of relay 210, which is still operated. Relay 420, at its springs 422, prepares a circuit for relay 350 which is now open at springs 463.

When the called mobile subscriber answers, relay 460 is again operated to now close the circuit of relay 350 at springs 463. Relay 350 now operates over a circuit from ground through springs 216, 281, 422, and 463 to the relay 350. Relay 350 opens the ground circuit for the ringing equipment at springs 351 so that the locked up X or Z relay, the C10 relay, and the relay 280 are all released to cut off the ring. Conversation may now proceed between the calling and called mobile stations.

*Release*

When either mobile subscriber initiates the release, the relay 520, at such station, operates as previously described to place a long pulse of carrier plus tone on the air to hold the pulse relay 380 and relay 390 at the control station operated, to in turn operate relay 330 and release the various relays at the station. During this release and whenever the relay 220 releases, it opens the circuit of relay 430 (FIG. 4), which has been held energized during conversation. Relay 430, upon falling back, closes a circuit for code sending relay 370 through springs 432 and 413 of locked up relay 410. Relay 370 energizes to close the circuit of code sending motor 385 at springs 372 to rotate the cams 386 and 387. Cam 386 locks up relay 370 for one revolution and cam 387 intermittently operates relay 360 in accordance with its code to close and open springs 363 and 364 to connect that code to the transmitter. This signal identifies the control station as a sending station in accordance with radio regulations. Relay 370 also closed springs 371 to place the transmitter on the air, and closed springs 374 to operate the C10 relay and relay 280 to generate the proper tone on lead 265.

In this type of call one of the mobile units must transmit for a moment every 1.4 minutes. Otherwise, the timer will release the connection.

The three tone detectors of FIG. 5, 132, 134, and 136 are identical except that the resonant input circuits are tuned to the frequency required: 1500 cycles for the gate, 2000 cycles for the pulse, and 2500 cycles for reverting call. As previously stated these frequencies may be varied as desired. A received input tone is amplified by the first tube in the series, and operates the associated relay by overcoming the cathode cut-off bias of the second tube.

The timing circuit of FIG. 6 operates to deenergize relay 520 whenever relay 550 either energizes or deenergizes, by connecting a charged capacitor, either 528 or 529, between the grid and cathode of tube 523. This will bias the tube to cut off, and relay 520 will again energize when the charge on the capacitor is dissipated through resistor 527.

The relay 640 for controlling the buzzer circuit in the mobile unit operates when both resonant relays 610 and 620 operate and transfer a positive voltage charge from capacitor 625 to 627.

The oscillator circuit (tube 570 and its associated elements) is of the typical phase shift variety. The frequency is changed by changing the value of two resistances in the phase shifting network. It provides stability with voltage and temperature variations peculiar to mobile units.

It should be noted that whenever relay 220 is deenergized upon release of a connection, in addition to opening the various locking circuits, it closes a restoring circuit for the reverting call switch 410 at springs 229. This circuit passes through a self-interrupting contact 475 and causes magnet M to continue to step the wipers 1, 2, and 3 until off-normal contact 476 opens when the wipers reach normal position.

It will thus be seen that I have provided a novel mobile radio telephone system in which the mobile subscribers are called directly from the telephone exchange through the medium of a control equipment connected to a line accessible to the switching equipment in the same manner as is a regular party line. That one mobile subscriber may call a regular telephone line through such control equipment and the connected line without the aid of an operator, and that in calls from one mobile subscriber to another, only the control equipment is used and again no operator is required, and none of the switching equipment in the exchange is used. When a mobile subscriber is called, a pair of selected frequency tones are utilized to select the party either when called from a telephone line or from another mobile party. A timed release circuit is utilized to insure release of all connections, whether or not a positive release signal is received.

Having fully described the features and aspects of my invention, what I consider to be new and desire to have protected by Letters Patent will be pointed out in the appended claims.

What is claimed is:

1. In a combined radio and wire telephone system, an automatic telephone exchange including automatic switches and wire lines accessible thereto, a plurality of mobile radio stations, a control equipment in said exchange having a pair of sets of terminals accessible to the automatic switches therein and having a radio receiver and transmitter associated therewith, a plurality of tone generators in said equipment, means for operating one of said switches in a particular manner when a call is being made from a wire line in the exchange to a mobile radio station to cause said switch to connect with a particular one of said sets of terminals and to apply a particular one of a plurality of frequencies of ringing current thereto dependent upon the mobile station being called, means in said control equipment including a series of tuned devices operated in a specific manner, dependent both upon the set of terminals seized and upon the frequency of the ringing current applied thereto, for selecting a particular pair of said tone generators and for causing tone currents from both selected generators to be simultaneously transmitted via said radio transmitter to the mobile stations, a pair of tuned devices at each mobile station, the pair of devices at each station responsive only to the simultaneous receipt of tone currents from a particular pair of tone generators to signal the subscriber at that station.

2. A combined mobile radio and wire telephone system including a plurality of mobile radio stations and an automatic telephone exchange having automatic switches therein and a control equipment for extending connections between wire lines in the exchange and said mobile stations, a radio receiver and transmitter associated with said equipment, a plurality of tone generators in said equipment, a pair of tuned devices at each mobile station responsive only to the simultaneous receipt of tone currents from a particular pair of said generators to signal the subscriber at that station, means in each mobile station for transmitting different series of radio impulses to said control equipment via said radio receiver to extend connections either to a wire line in the exchange or to another mobile station, step by step means in said equipment operated in response to the receipt of a particular series of radio impulses received from one of said mobile stations, when one mobile station is calling another mobile station, said step by step means operated by said impulses to select a particular pair of said tone generators and cause tone currents therefrom to be transmitted via said radio transmitter to the other mobile stations to signal a particular station by operating the tuned devices thereat, means in said equipment operated by other series of impulses transmitted from one of said mobile stations to operate said automatic switches to extend connections to telephone subscribers in the exchange, a pair of sets of terminals in the exchange commonly connected to said equipment and accessible to said automatic switches, means in the exchange for operating certain of the automatic switches to connect with either of said sets of terminals and to apply different frequencies of ringing current thereto when a line in the exchange is calling a mobile station, and other means in said equipment operated in a particular manner, dependent both upon the set of terminals seized and the particular frequency of ringing current applied thereto, for also selecting particular pairs of said generators and causing tone currents from the selected pairs to be transmitted via said radio transmitter to the mobile stations to operate the tuned devices of particular stations to signal the subscribers thereat.

References Cited in the file of this patent

UNITED STATES PATENTS

| | | |
|---|---|---|
| 1,719,485 | Pease | July 2, 1929 |
| 2,516,763 | Edson | July 25, 1950 |
| 2,763,726 | Weller | Sept. 18, 1956 |
| 2,843,675 | Collins | July 15, 1958 |
| 2,870,263 | Elliott | Jan. 20, 1959 |

FOREIGN PATENTS

| | | |
|---|---|---|
| 1,010,928 | France | Mar. 26, 1952 |
| 504,867 | Canada | Aug. 3, 1954 |
| | (Corresponding U.S. 2,583,032 Jan. 22, 1952) | |
| 748,783 | Great Britain | May 9, 1956 |
| | (Corresponding U.S. 2,933,560 Apr. 19, 1960) | |